United States Patent [19]

Schmidt et al.

[11] Patent Number: 4,740,151
[45] Date of Patent: Apr. 26, 1988

[54] SEALING AND RETAINING BUSHING FOR INJECTION MOLDING

[75] Inventors: Harald H. Schmidt, Georgetown; Henry J. Rozema, Brampton, both of Canada

[73] Assignee: Mold-Masters Limited, Georgetown, Canada

[21] Appl. No.: 920,687

[22] Filed: Oct. 20, 1986

[30] Foreign Application Priority Data

Oct. 15, 1986 [CA] Canada ................................ 520519

[51] Int. Cl.$^4$ ............................................ B29C 45/20
[52] U.S. Cl. ................................ 425/549; 264/328.8; 264/328.15; 425/562; 425/564; 425/566; 425/570; 425/571; 425/572
[58] Field of Search ............... 425/547, 549, 562, 563, 425/564, 566, 568, 569, 570, 571, 572, 577, 588; 264/328.8, 328.15

[56] References Cited

U.S. PATENT DOCUMENTS

| | | | |
|---|---|---|---|
| 4,026,518 | 5/1977 | Gellert | 425/242 R |
| 4,213,751 | 7/1980 | Fernandez | 425/566 |
| 4,433,969 | 2/1984 | Gellert | 425/549 |
| 4,446,360 | 5/1984 | Gellert | 219/421 |
| 4,530,654 | 7/1985 | Rose | 425/566 |
| 4,588,367 | 5/1986 | Schad | 425/549 |
| 4,609,138 | 9/1986 | Harrison | 228/161 |
| 4,657,496 | 4/1987 | Ozeki et al. | 264/328.8 |
| 4,663,811 | 5/1987 | Gellert | 425/549 |

FOREIGN PATENT DOCUMENTS 1174020 11/1984 Canada .

OTHER PUBLICATIONS

Husky Hot Runner Systems Catalogue C3.0.

*Primary Examiner*—Jay H. Woo
*Assistant Examiner*—Timothy W. Heitbrink
*Attorney, Agent, or Firm*—Riches, McKenzie & Herbert

[57] ABSTRACT

This invention relates to sealing and support bushings which are located between the manifold and the mold back plate to encircle each valve pin in a multi-cavity valve gated injection molding system. Each bushing is bolted through the manifold to a respective heated nozzle with central bores in alignment to receive the valve pin therethrough. The bushing has an outer flanged portion which extends to contact the mold back plate and forms a leakage containment chamber between them. Thus, the bushings retain the manifold in place, seal against substantial melt leakage around the reciprocating valve pins and collect any melt which does escape to prevent it entering the insulative air space between the hot manifold and the cooled mold back plate. Location of the bushing between the manifold and the mold back plate also enables the use of a standard manifold having longitudinal and transverse bores without requiring diagonal bores.

4 Claims, 2 Drawing Sheets

SEALING AND RETAINING BUSHING FOR INJECTION MOLDING

BACKGROUND OF THE INVENTION

This invention relates to injection molding and more particularly to an improved bushing to be positioned around each valve pin to support the mold back plate in a multi-cavity valve gated injection molding system.

In such a system wherein a melt passage branches in a manifold and extends through a heated nozzle to each gate, it is necessary to provide an insulative air space between the hot manifold and the cooled mold back plate. A seal must be provided to prevent leakage of pressured melt around the reciprocating valve pin into the air space between them. The manifold must also be retained tightly against the nozzles to prevent melt leakage between them.

In the past, it has been known to use spacers seated in the mold back plate to space the manifold from the mold back plate and provide the insulative air space. Alternatively, bolts extending from the manifold into the cavity plate can be used to retain the manifold against the nozzle to prevent leakage between them and to properly locate the manifold to provide the necessary air spaces. An example of this structure is shown in the applicant's U.S. Pat. No. 4,530,654 which issued July 23, 1985.

It is also well known to provide a bushing seal with a central bore through which the valve pin fits snugly to prevent leakage of melt into the air space. One example in which the bushing seal seats in the nozzle is shown in U.S. Pat. No. 4,026,518 to Gellert entitled "Bushing Seal for Valve Gated Injection Mold" which issued May 31, 1977. Another example in which the bushing is fixed to the nozzle is shown in U.S. Pat. No. 4,433,969 to Gellert entitled "Injection Molding Valve Pin Bushing and Method" which issued Feb. 28, 1984.

However, as seen in U.S. Pat. No. 4,530,654 referred to above, these previous systems have the disadvantages that the manifold must be drilled on the diagonal bores to provide the melt passage and the bolts must be provided extending into the cavity plate to tighten the manifold against the heated nozzles. This adds to manufacturing costs and increases the complexity of molularization of manifold systems.

SUMMARY OF THE INVENTION

Accordingly, it is an object of the invention to at least partially overcome these disadvantages by providing a bushing which is located between the manifold and the mold back plate and which acts to both retain the manifold in place and to provide the necessary air space between the mold back plate and the manifold and to prevent leakage of the melt pin into the air space.

To this end, in one of its aspects, the invention provides a multi-cavity valve gated injection molding system comprising a manifold extending between a mold back plate and a plurality of spaced heated nozzles seated in a cavity plate, an elongated valve pin having a driven end and a tip end mounted in a central bore in each nozzle to extend through a respective aligned transverse bore through the manifold, the driven end of the valve pin being operatively connected to valve pin actuating mechanism mounted in the mold back plate whereby the valve pin is reciprocated between a retracted open position and a closed position wherein the tip end of the valve pin is seated in a gate extending through the cavity plate to a cavity, and a melt passage branching from a common inlet in the manifold to extend through a longitudinal bore connecting to the transverse bore and around the valve pin through the central bore in each nozzle to the respective gate, having the improvement wherein, a sealing and support bushing is mounted around each valve pin between the manifold and the mold back plate each bushing having a central bore which receives the valve pin therethrough whereby substantial leakage of pressurized melt around the reciprocating valve is prevented, each bushing being fixed to the manifold and having an outer flanged portion which extends into bearing contact against the mold back plate during operation whereby the manifold is securely retained in position and a containment chamber is formed within the flanged portion to prevent melt which does leak through the central bore past the reciprocating valve pin from entering the surrounding air space.

Further objects and advantages of the invention will appear from the following description taken together with the accompanying drawings.

DETAILED DESCRIPTION OF THE DRAWINGS

Figure 1:
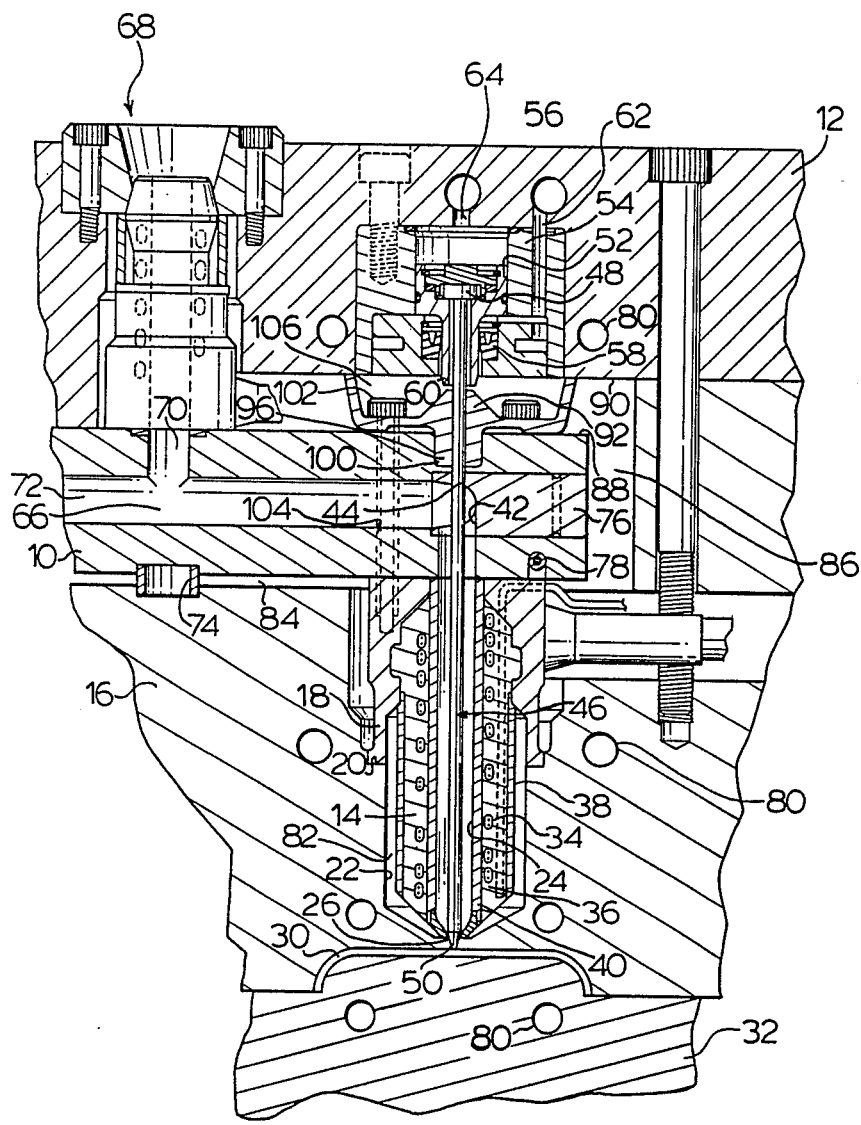
FIG. 1 is a sectional view of a portion of a multi-cavity valve gated injection molding system during operation having a sealing and support bushing according to a preferred embodiment of the invention.

Reference is first made to FIG. 1 which shows a portion of a multi-cavity valve gated injection molding system in which a manifold extends between a mold back plate 12 and a number of heated nozzles 14 seated in a cavity plate 16. Each nozzle 14 has a locating bushing portion 18 which sits on a shoulder 20 in a well 22 in the cavity plate 16 to locate it with its central bore 24 in alignment with a gate 26. The gate 26 extends through the cavity plate 16 to a cavity 30 formed between the cavity plate 16 and a movable core plate 32. In this embodiment, the heated nozzles or sprue bushings 14 are made as described in U.S. Pat. No. 4,446,360 to Gellert entitled "Sprue Bushing Connector Assembly" which issued May 1, 1984. A helical electrical heating element 34 is cast in a copper portion 36 between a stainless steel outer portion 38 and a stainless steel inner portion 40 which forms the central bore 24.

The central bore 24 of each heated nozzle 14 is in alignment with an enlarged portion 42 of a transverse bore 44 extending through the manifold. An elongated valve pin 46 having an enlarged driven end 48 and a tapered tip end 50 extends through the transverse bore 44 through the manifold 10 and the central bore 24 of the nozzle. The driven end 48 of the valve pin 46 is connected to actuating mechanism seated in the mold back plate 12. The actuating mechanism includes a piston 52 which reciprocates in a cylinder 54. The valve pin 46 extends through the piston 52 and the enlarged driven end is secured to it by plug 56 as described in more detail in the applicant's Canadian patent application Ser. No. 524,969 entitled "Mechanism for Valve Gated Injection Molding with Resilient Retaining Ring" filed Dec. 10, 1986. A V-shaped seal 58 extends around the neck 60 of the piston 52 to prevent leakage of pressurized hydraulic fluid. The piston 52 is actuated by the application of fluid pressure through hydraulic fluid ducts 62,64, which are drilled in the mold back plate 12. In this arrangement, the flow of hydraulic fluid also provides cooling to the piston and particularly to the area around the V-shaped seal 58 as described in more detail in the applicant's Canadian patent application Ser. No. 520,604, entitled "Fluid Cooled Hydraulic Actuating Mechanism for Injection Molding" filed Oct. 17, 1986. However, various valve pin hydraulic actuating mechanisms are well known in the art and need not be described further.

A melt passage 66 extends through a heated sprue bushing 68 which receives pressurized melt from a molding machine (not shown) to an inlet 70 to the manifold 10 from which it branches out through longitudinal bores 72. The sprue bushing 68 in this embodiment is made by the method described in Gellert's U.S. Pat. No. 4,663,811 entitled "Manufacturing Method for Selected Gate Configuration Injection Molding Nozzles" filed Dec. 2, 1985. The manifold 10 is centrally located relative to and spaced from the cavity plate 16 by a locating ring 74 which is seated in both of them. The melt passage 66 extends through each longitudinal bore 72 in the manifold to the enlarged portion 42 of the transverse bore 44 and through the central bore 24 of the nozzle 10 around the valve pin 46 and the gate 26. A machined plug 76 is brazed into the manifold 10 to provide smoothly joint between them as described in the applicant's U.S. Pat. No. 4,609,138 entitled "Method of Manufacturing Injection Molding Manifold with Plugs" which issued Sept. 2, 1986.

As is well known, it is critical to successful operation of the system that the hot melt be maintained within a certain temperature range as it flows along the melt passage 66 to the gate 26. Thus, the sprue bushing 68 is heated, each nozzle 14 is heated by the electrical heating element 34, and the manifold 10 is heated by an electrical heating element 78 which is cast into it as described in Gellert's Canadian Pat. No. 1,174,020 entitled "Injection Molding Manifold Member and Method of Manufacture" which issued Sept. 11, 1984. As is also well known, it is necessary to separate these heated components of the system from the adjacent mold back plate 12 and cavity plate 16 which are cooled by water flowing through cooling channels 80. Thus, an insulative air space 82 is provided between each nozzle 14 and the surrounding cavity plate 16 by the locating bushing portion 18 seating on shoulder 20. Similarly, another insulative air space 84 is provided between the hot manifold 10 and the cooled cavity plate 16 by locating ring 74 and the height of the nozzles 14 to which the manifold 10 is secured. A further insulative air space 86 is provided between the upper surface 88 of the hot manifold 10 and the lower surface 90 of the cooled mold back plate 12 by sealing and retaining bushings 92 which are screwed to the upper surface 88 of the manifold around each of the valve pins 46.

Figure 2:
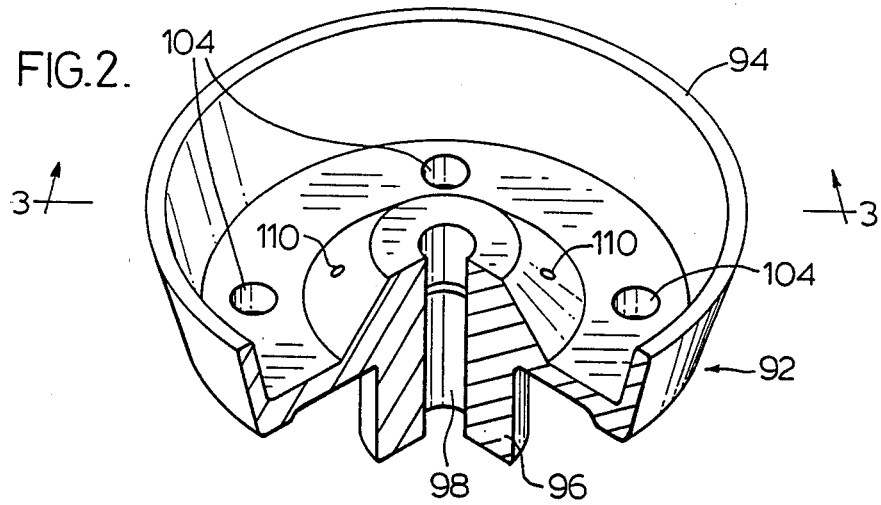
FIG. 2 is an isometric view of the sealing and support bushing seen in FIG. 1.
Figure 3:
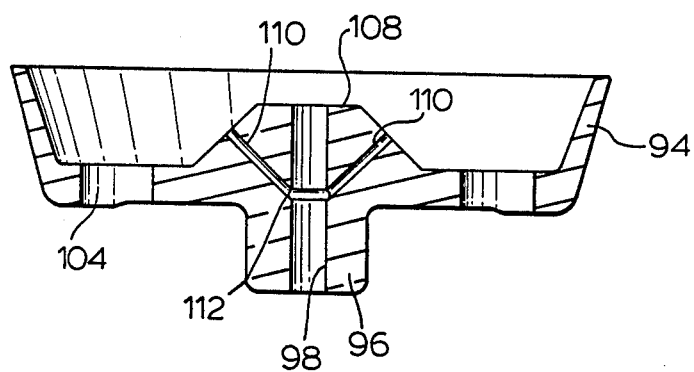
FIG. 3 is a sectional view taken along line 3—3 in FIG. 2.

As may more clearly be seen in FIGS. 2 and 3, the sealing and retaining bushings 92 are made with an outer flanged portion 94 and collar portion 96 through which a central bore 98 extends to snugly receive the valve pin 46. Referring again to FIG. 1, each bushing 92 is located with the collar portion 96 seated in a well 100 in the manifold 10 with the central bore 98 of the bushing 92 in alignment with the transverse bore 44 through the manifold to snugly receive the valve pin 46 therethrough. The bushing 92 and nozzle 14 are securely fixed to opposite sides of the manifold 10 by bolts 102 which extend through aligned holes 104 in the bushing 92 and the manifold 10 and into the nozzle 14. The outer flanged portion 94 of the bushing 92 flairs slightly outwardly to contact the lower surface 90 of the mold back plate 12 around the cylinder 54 during operation. As may be seen, this forms a containment cavity 106 within the flanged portion 94 between the bushing 92 and the cylinder 54 seated in the mold back plate 12. This leakage containment chamber 106 prevents any melt which does leak through the central bore 98 past the reciprocating valve pin 46 from escaping into the surrounding air space 86 and damaging the system wiring. Any material which is trapped in the cavity 106 is held in contact with the cold cylinder 54 until it is removed during regular maintenance. The bushing 92 is normally made of H13 tool steel and the outwardly flaired shaped provides the flanged portion 94 with some resilience under the load required to retain the manifold 10 in place, as described in more detail below. The bushing 92 has a raised center portion 108 which increases the length of the central bore 98 through which the valve pin 46 extends, and thus improves the seal provided by the bushing 92 against leakage of pressurized melt around the reciprocating valve pin. Diagonal vent ducts 110 extending to a circumferential groove 112 in bore 98 provide for the escape of corrosive gases which may be generated by the decomposition of some polymers trapped between the reciprocating valve pin and the surrounding bore 98. Thus, during operation of the system as can be seen in FIG. 1, the bushings 92 provides the multiple function of retaining the manifold 10 and nozzles 14 tightly in place, sealing against melt leakage around the reciprocating valve pin 46 and providing a containment chamber to hold any melt which does leak to prevent it escaping into the surrounding insulate air space 86 between the hot manifold 10 and the cooled mold back plate 12.

In use, the system is assembled as described above. The bushings 92 are bolted through the manifold 10 to the nozzles 14. This applies an initial preload so that melt does not escape between them initially. The height of the flanged portions 94 of the cold bushings 92 is slightly less than the width of the desired air space 86 to allow for heat expansion. Similarly, there must be provision for slight lateral movement of the valve pin 46 in the piston 52 to allow for lateral thermal expansion of the manifold 10 from the central locating ring 74. Electrical power is applied to the sprue bushing 68 and the heating elements 34,78 of the nozzles 14 and the manifold 10 to heat them to predetermined temperatures. The sealing and retaining bushings 92 expand into bearing contact with the mold back plate 12 to apply a further load to securely tighten the manifold 10 and the nozzles 14 into position and to maintain the desired air gaps 82,84,86. Hot pressurized melt is then introduced into the sprue bushing 68 from a molding machine (not shown) and flows through the melt passage 66. Controlled hydraulic fluid pressure is applied to the fluid ducts 62,64 to control simultaneous actuation of the valve pins 46 according to a predetermined cycle in a conventional manner. With the valve pins 46 in the retracted open position, the melt flows through the melt passages 66 to the gates 26 and into the cavities 30. When the cavities 30 are full, the pressure is held momentarily to pack. The hydraulic pressure is then applied to reciprocate the valve pins 46 to the closed position with each tip end 50 seated in one of the gates 26. The injection pressure is then reduced and the position held for a short cooling period before the mold opens for ejection. After the mold is closed again, the hydraulic pressure is applied to withdraw the valve pins to the open position and the melt injection pressure is reapplied to refill the cavities. This cycle is repeated continuously every few seconds depending upon the size and shape of the cavities and the type of material being molded.

Location of the sealing and retaining bushings 92 on the manifold 10 enables them to be used to provide the necessary insulative air space 86 between the manifold 10 and the mold back plate 12. It also allows the use of a standard type manifold 10 in which the bores 44 extends transversely through it rather than requiring a diagonal portion. This allows modularization of manifold systems with a multitude of independent main and sub manifolds. While it is still necessary to provide a variety of manifold shapes depending on cavity configurations, this means that the same standard manifold structure can be used for valve gating as well as a multitude of other gating methods, thus considerably reducing manufacturing and inventory costs. Leakage of pressured melt from the melt passage 66 around the reciprocating valve pins 46 is substantially prevented by the snug fit through the aligned bores 44 and 98 through the manifold and the sealing and retaining bushing. Any melt which does manage to escape is trapped in the containment cavity 106 from which it is cleaned out during regular maintenance.

While the description of sealing and retaining bushing and the injection molding system have been given with respect to a preferred embodiment, it is not to be construed in a limiting sense. Variations and modifications will occur to those skilled in the art. For instance, it is apparent that the bushing 92 can have alternate configurations from that shown. Similarly, the injection molding system can have various manifold configurations and different valve pin actuating mechanisms and heated nozzles can be used. Reference is made to the appended claims for a definition of the invention.

What we claim is:

1. In a multi-cavity valve gated injection molding system comprising a manifold extending between a mold back plate and a plurality of spaced heated nozzles seated in a cavity plate, an elongated valve pin having a driven end and a tip end mounted in a central bore in each nozzle to extend through a respective aligned transverse bore through the manifold, the driven end of the valve pin being operatively connected to a hydraulic valve pin actuating mechanism mounted in the mold back plate whereby the valve pin is reciprocated between a retracted open position and a closed position wherein the tip end of the valve pin is seated in a gate extending through the cavity plate to a cavity, and a melt passage branching from a common inlet in the manifold to extend through a longitudinal bore connecting to the transverse bore and around the valve pin through the central bore in each nozzle to the respective gate, the improvement wherein; a sealing and retaining bushing being mounted around each valve pin between the manifold and the mold back plate, each bushing having a central bore which receives the valve pin therethrough whereby substantial leakage of pressurized melt around the reciprocating valve pin is prevented, each bushing being fixed to the manifold by bolts which extend through the manifold and into the heated nozzle to fix the bushing and the heated nozzle to opposite sides of the manifold, each bushing having an outer flanged portion which extends into bearing contact against the mold back plate during operation whereby the manifold is securely retained in position to provide an insulative air space between the manifold and the mold back plate and a containment chamber is formed within the flanged portion to prevent melt which does leak through the central bore past the reciprocating valve pin from entering the surrounding air space.

2. An injection molding system as claimed in claim 1 wherein the outer flanged portion flairs outwardly to be slightly resilient.

3. In an injection molding system as claimed in claim 1 wherein each bushing has a collar portion which is seated in a well in the manifold.

4. In an injection molding system as claimed in claim 3 wherein the bushings are made of steel.

* * * * *